No. 724,341. PATENTED MAR. 31, 1903.
W. H. SHEFFIELD.
FILLING APPARATUS.
APPLICATION FILED APR. 21, 1902.
NO MODEL. 2 SHEETS—SHEET 1.
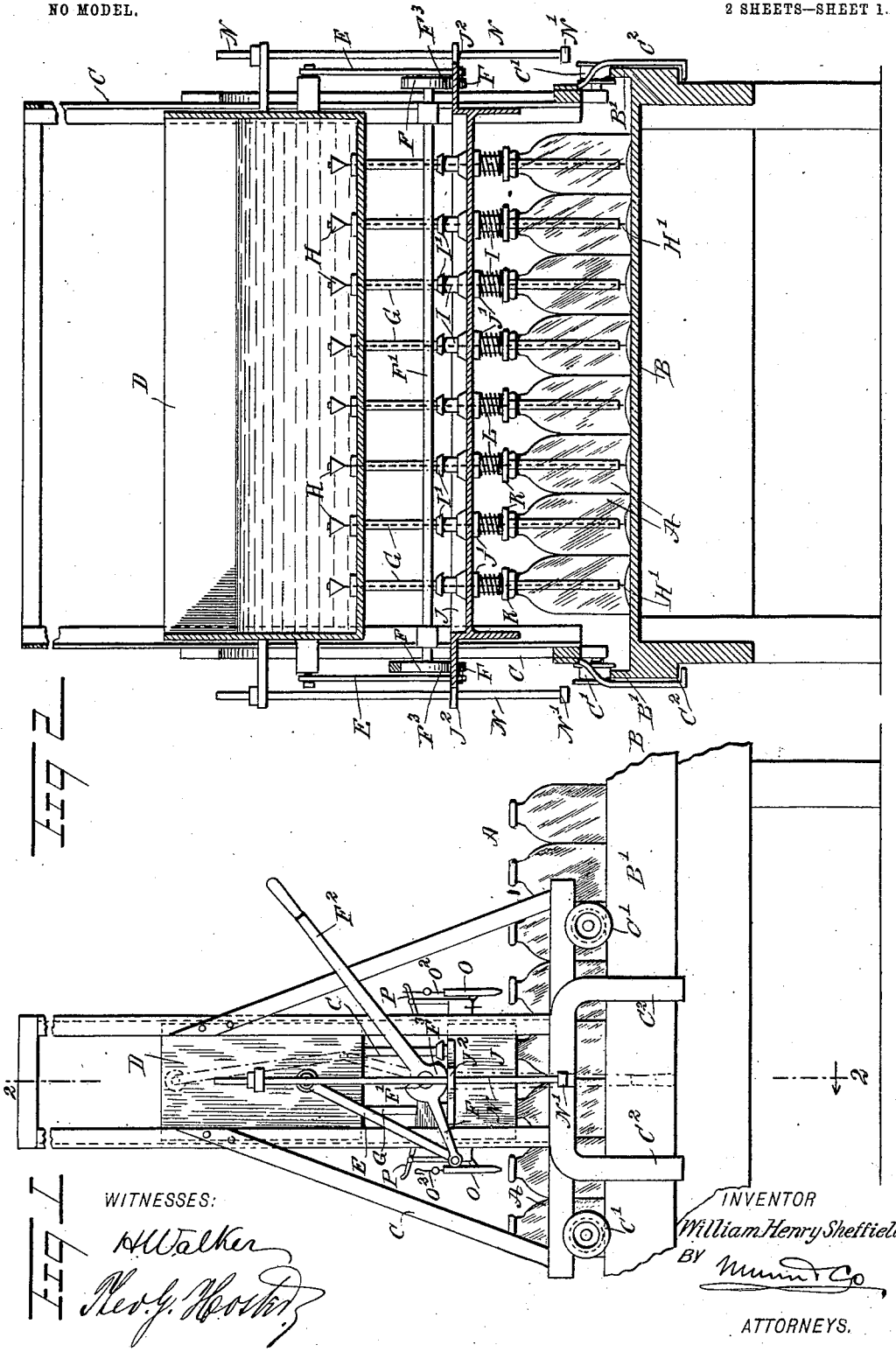
WITNESSES:
INVENTOR
William Henry Sheffield
BY
ATTORNEYS.

No. 724,341. PATENTED MAR. 31, 1903.
W. H. SHEFFIELD.
FILLING APPARATUS.
APPLICATION FILED APR. 21, 1902.
NO MODEL. 2 SHEETS—SHEET 2.
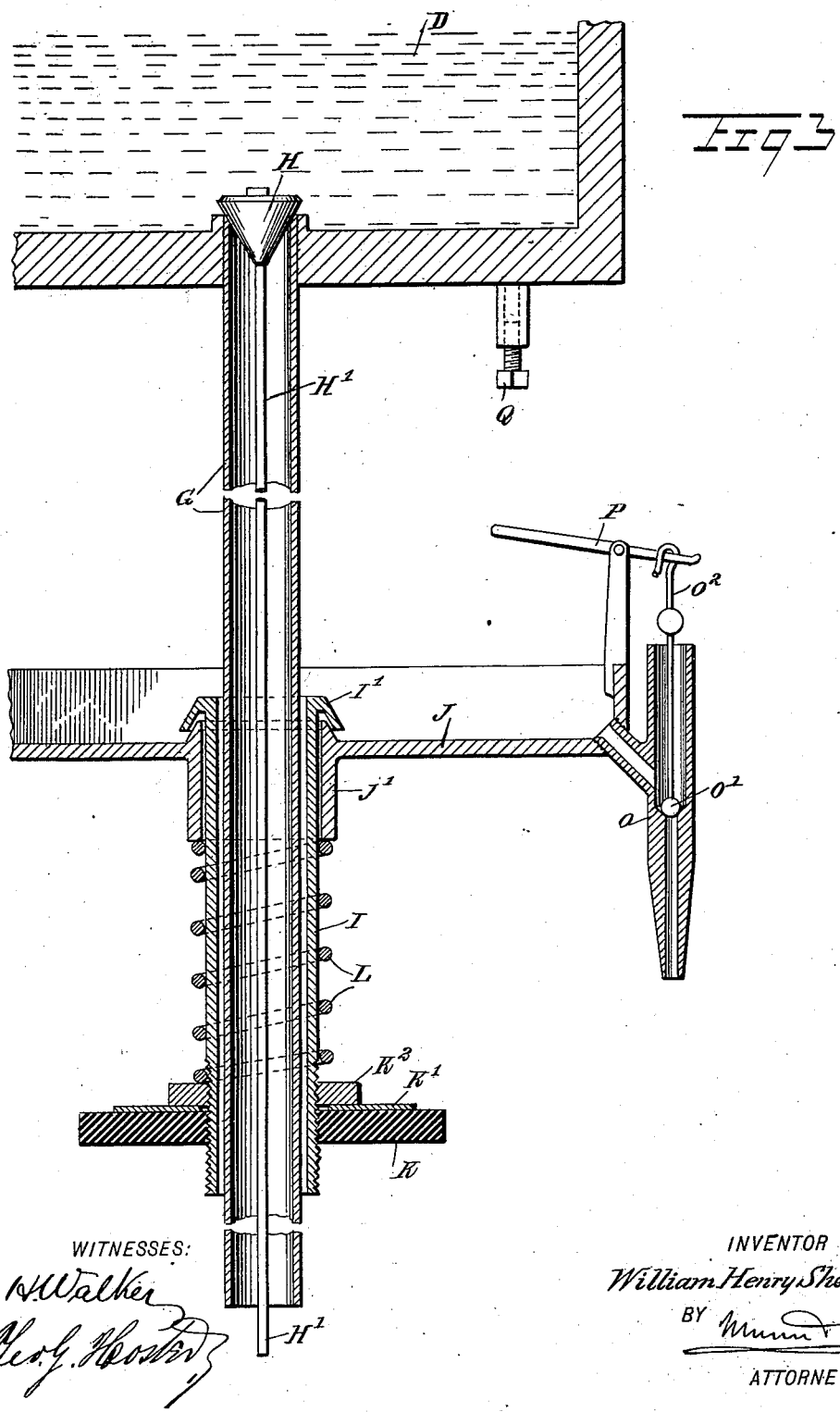

UNITED STATES PATENT OFFICE.

WILLIAM HENRY SHEFFIELD, OF HOBART, NEW YORK.

FILLING APPARATUS.

SPECIFICATION forming part of Letters Patent No. 724,341, dated March 31, 1903.

Application filed April 21, 1902. Serial No. 103,945. (No model.)

*To all whom it may concern:*

Be it known that I, WILLIAM HENRY SHEFFIELD, a citizen of the United States, and a resident of Hobart, in the county of Delaware and State of New York, have invented a new and Improved Filling Apparatus, of which the following is a full, clear, and exact description.

The object of the invention is to provide a new and improved filling apparatus which is simple and durable in construction and more especially designed for filling milk and other liquids into a number of bottles or other receptacles at the same time without danger of causing foam or froth during the filling operation, thus allowing proper filling of the receptacles.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement in a filling position. Fig. 2 is a transverse section of the same on the line 2 2 of Fig. 1, and Fig. 3 is an enlarged sectional side elevation of the improvement in a non-filling position.

The bottles or other receptacles A to be filled are arranged in transverse rows and set on a table B, provided on its sides with longitudinally-extending rails B', on which are mounted to travel the wheels C' of the frame C, extending over the table B, and in which is mounted to move up and down the liquid-supply D, containing the liquid to be filled into the receptacles A, as hereinafter more fully described. The liquid-supply D is preferably in the form of a tank; but large pipes, connected with an overhead reservoir, may be employed, if desired. The liquid-supply D is pivotally connected at its front and rear sides by links E with arms F, attached to a shaft F', extending transversely and journaled in suitable bearings attached to the framework C. One of the arms F is provided with an extension forming a handle F², adapted to be taken hold of by the operator to impart a swinging motion to the handle to turn the shaft F', and thereby cause the arms F and links E to impart an upward or a downward movement to the liquid-supply D. Thus when the handle F² is moved downward the liquid-supply D is moved upward out of a filling position, and when the handle F² is moved upward the liquid-supply D is moved downward to fill the receptacles A, as hereinafter more fully described.

On the under side of the liquid-supply D are secured one, two, or more transverse rows of filling-tubes G, adapted to pass into the receptacles A, within a short distance of the bottom thereof, as plainly indicated in Figs. 1 and 2, so that the liquid flowing from the supply D into the receptacles A by way of the filling-tubes G does not foam or froth, and consequently allows proper filling of the receptacles. The upper ends of the filling-tubes G within the supply D are normally closed by valves H, having valve-stems H' extending down through the filling-tubes G to engage the bottoms of the receptacles A at the time the liquid-supply D moves into a lowermost position, so that the valves H are lifted off their seats to open the filling-tubes G to the liquid and to allow the latter to flow through the filling-tubes into the receptacles A to fill the same.

On each of the filling-tubes G is arranged a tubular air-vent I, mounted to slide vertically in a bearing J', formed on a drip-pan J, mounted to slide on the frame C between the top of the receptacles A and the bottom of the liquid-supply D. On the lower end of each air-vent I (see Fig. 3) is secured a seat K, made of rubber and adapted to be seated on the top of the corresponding receptacle A, so as to close the mouth thereof to direct the air escaping from the receptacle A during the filling operation into the air-vent I and through the same, the air-vent also serving as an overflow in case the supply D is not raised by the operator manipulating the handle F² after the receptacles are filled to the desired height. Now such liquid rising in the air-vent I flows over the upper end thereof and down an inclined flange I' into the drip-pan J, to accumulate therein. By screwing the nut K² up and down on the air-vent I and moving the washer K' and seat K correspondingly with the nut I am enabled to regulate the distance the lower end of the vent I is to extend into the receptacle A to fill the latter up to the lower edge of the said vent I. The space left in the neck of the receptacle above the said lower edge of the air-vent I is subsequently filled with the liquid contained in the filling-tube G after the valve H is closed and the filling-tube moves out of the receptacle A.

The seat K, previously mentioned, is engaged on top by a metallic washer K', engaged by a nut K², screwing on the lower threaded end of the tubular air-vent I, and on the nut K² presses one end of a spring L, coiled on the air-vent I and abutting with its other end on the bearing J'. By the use of the spring L the seat K is pressed in firm contact with the mouth of the receptacle A, so as to close the same, as previously explained, to direct the air through the air-vent I and also to cause overflow liquid to rise through the air-vent and finally pass into the drip-pan J.

The drip-pan J is controlled in its up-and-down movement from the liquid-supply D during a part of the latter's stroke, and for this purpose the front and rear sides of the pan J are provided with apertured lugs J², through which extend the rods N, carried at their upper ends by the liquid-supply D and provided at their lower ends with collars N', adapted to abut against the under side of the lugs J² at the time the liquid-supply D nears an uppermost position. After the seats K of the air-vents I are seated on the top of the receptacles A the operator by pushing the lever-handle F² farther up can press the pan farther downward by cams F³ on the levers F, the said cams engaging the top of the lugs J², as plainly shown in the drawings. Thus the seats K are firmly seated on the top of the receptacles A, and each air-vent I extends the desired distance down into the neck of the receptacle, as before explained.

The drip-pan J is provided with discharge-spouts O for delivering the liquid from the pan J into a receptacle A, located in advance of the receptacles to be filled at the time by the filling-tubes G from the liquid-supply D. (See Fig. 1.) Each of the spouts O, of which there are preferably two, one on the front and one on the rear side of the pan, is provided with a valve O', having a weighted valve-stem O², adapted to be hooked onto a lever P, fulcrumed on the drip-pan J (see Fig. 3) and adapted to be engaged by the head of a set-screw Q, screwing in the bottom of the supply D, so that when the latter moves into a lowermost filling position the valve O' is opened at the time the valves H are opened, so that the liquid from the drip-pan J flows into a vessel A, located in advance of the vessels into which liquid now flows from the supply D by the filling-tubes G.

The operation is as follows: When the handle F² is down, then the liquid-supply D is in an uppermost position and the lower ends of the filling-tubes G and valve-stems H', as well as the seats K, are above the tops of the receptacles A, so that the frame A can be readily slid along the rails B' to bring the filling-tubes G in register with rows of empty receptacles. When the desired position has been reached, the operator moves the handle F² upward, so that the liquid-supply D moves downward, and with it the drip-pan J, supported at the time on the collars N' of the rods N, until the seats K rest on the tops of the receptacles A, and thus prevent further downward movement of the drip-pan J and the air-vent I, while the liquid-supply D moves still farther down, so as to pass the lower ends of the filling-tubes G and stems H' into the receptacles. The valves H are finally opened, as previously explained, at the time the lower ends of the filling-tubes G are close to the bottoms of the receptacles A, so that the liquid can flow from the supply D through the filling-tubes G into the receptacles A to fill the same. As soon as the receptacles are filled to the desired height the operator in charge of the machine pulls the handle F² downward, so as to cause an upward movement of the liquid-supply D and automatic seating of the valves H to prevent further outflow of the liquid from the supply D. As the latter ascends the rods N are carried along, and the collars N' finally engage the lugs J², so that on the further upward movement of the supply D the drip-pan J is carried along, and with it the parts supported thereby, so that the seats K move out of engagement with the upper ends of the receptacles A at the time the filling-tubes G and stems H' move out of the said receptacles. The frame C is now again wheeled forward on the rails B', and the above-described operation is then repeated.

In order to hold the frame C against accidental displacement on the table, I provide guard-arms C², as indicated in Figs. 1 and 2.

Having thus described my invention, I claim as new and desire to secure by Letters Patent—

1. A filling apparatus, comprising a vertically-movable liquid-supply for containing the liquid to be filled into receptacles, a filling-tube leading from the bottom of the said liquid-supply and adapted to be passed into a receptacle to be filled, a spring-pressed tubular air-vent through which extends the filling-tube, a seat on the air-vent for engaging the top of the receptacle to be filled, and a valve controlling the inlet to the filling-tube within the liquid-supply, the said valve having a valve-stem extending through the filling-tube, to engage the bottom of the receptacle to be filled at the time the liquid-supply moves into a lowermost position, as set forth.

2. A filling apparatus, comprising a liquid-supply for containing the liquid to be filled into receptacles, means for moving the liquid-supply up and down, a drip-pan mounted to travel with the liquid-supply during part of the latter's movement, a filling-tube leading from the liquid-supply and adapted to pass into the receptacle to be filled, a spring-pressed tube forming an air-vent and an overflow, the tube extending through the drip-pan, and through which extends loosely a filling-tube, and a seat on the said tube, adapted to be seated on the receptacle, as set forth.

3. A filling apparatus, provided with a filling device for filling receptacles, a drip-pan for receiving the overflow liquid from the filling device, and a valved outlet from the drip-pan, to direct the overflow liquid from said pan into a receptacle to be subsequently filled by the filling device, the said valved outlet being controlled from the said filling device, as set forth.

4. A filling apparatus, provided with a filling device for filling receptacles, a drip-pan for receiving the overflow liquid from the filling device, provided with a discharge-spout, a valve for controlling the passage of liquid through said spout, and means controlled by the filling device for operating said valve, as set forth.

5. A filling apparatus provided with a liquid-supply, a valved filling-tube leading from the liquid-supply into the receptacle to be filled, an air-vent and overflow-tube through which loosely extends the filling-tube, a drip-pan below the liquid-supply and in which the air-vent and overflow-tube is mounted to slide, the said pan being provided with a discharge-spout, a valve for controlling the said spout, and means controlled by the liquid-supply for operating the said valve, as set forth.

6. A filling apparatus, provided with a liquid-supply, a filling-tube leading therefrom and adapted to pass into the receptacle to be filled, a valve controlling the flow of the liquid from the liquid-supply to the filling-tube, an air-vent and overflow-tube, through which extends loosely the said filling-tube, the said air-vent and overflow-tube being spring-pressed and provided with a seat adapted to engage the top of the receptacle, a drip-pan in which the air-vent and overflow-tube is mounted to slide, a spout on the said drip-pan, a valve in the said spout, and a lever adapted to be engaged by the stem of the said valve and controlled from the said liquid-supply, as set forth.

7. A filling apparatus provided with a drip-pan, and an air-vent and overflow-tube projecting from the bottom of the said drip-pan and adapted to extend into the receptacle to be filled, the upper end of the air-vent and overflow-tube opening into the drip-pan, as set forth.

8. A filling apparatus provided with a drip-pan, an air-vent and overflow-tube mounted to slide in the said drip-pan and adapted to extend into the receptacle to be filled, the upper end of the air-vent opening into the drip-pan, and an adjustable seat on the air-vent and overflow-tube and adapted to be seated on the top of the receptacles, as set forth.

9. A filling apparatus provided with a drip-pan, an air-vent held in the said drip-pan and adapted to extend into the receptacle to be filled, the upper end of the air-vent opening into the drip-pan, an adjustable seat on the air-vent and adapted to be seated on the top of the receptacles, and a manually-controlled device for pressing the drip-pan, whereby the seats will be forced firmly into contact with the receptacles, as set forth.

10. A filling apparatus provided with a drip-pan, an air-vent and overflow-tube mounted to slide in the said drip-pan and adapted to extend into the receptacle to be filled, the upper end of the air-vent and overflow-tube opening into the drip-pan, and its lower end provided with a seat and a spring interposed between the seat and the drip-pan, as set forth.

11. A filling apparatus, provided with a drip-pan, and an air-vent and overflow-tube mounted to slide in the said drip-pan and having an overflow-flange for directing the overflow liquid from the tube into the pan, as set forth.

12. A filling apparatus comprising a liquid-supply mounted to move up and down a valved filling-tube on the said supply and moving with the same, an air-vent through which extends the filling-tube loosely, a support for the air-vent said support being free to move downward and a connection between the said support and the liquid-supply to move the support during part of the latter's stroke, as set forth.

13. A filling apparatus comprising a liquid-supply mounted to move up and down a valved filling-tube on the said supply and moving with the same, an air-vent through which extends the filling-tube loosely, a support for the air-vent, a connection between the said support and the liquid-supply to move the support during part of the latter's stroke, and a lever having connection with the said supply to move the latter up and down, the lever having a cam for acting on the said support to move the later independent of the supply, as set forth.

14. A filling apparatus comprising a liquid-supply, a filling-tube thereon, a spring-pressed air-vent through which passes loosely the said filling-tube, a support in which the said air-vent is slidably mounted and a cam-lever for moving the supply up and down and for imparting independent movement to the said support, as set forth.

In testimony whereof I have signed my name to this specification in the presence of two subscribing witnesses.

WILLIAM HENRY SHEFFIELD.

Witnesses:
JAMES R. COWAN,
JAMES HOWARD SCOTT.